United States Patent
Uchiyama et al.

(10) Patent No.: US 9,454,808 B2
(45) Date of Patent: Sep. 27, 2016

(54) PATTERN PROCESSING APPARATUS, PATTERN PROCESSING METHOD, AND PATTERN PROCESSING PROGRAM

(71) Applicants: Yukinaka Uchiyama, Tokyo (JP); Fumihiro Hasegawa, Tokyo (JP)

(72) Inventors: Yukinaka Uchiyama, Tokyo (JP); Fumihiro Hasegawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 37 days.

(21) Appl. No.: 14/399,252

(22) PCT Filed: May 20, 2013

(86) PCT No.: PCT/JP2013/064549
§ 371 (c)(1),
(2) Date: Nov. 6, 2014

(87) PCT Pub. No.: WO2013/176278
PCT Pub. Date: Nov. 28, 2013

(65) Prior Publication Data
US 2015/0131911 A1      May 14, 2015

(30) Foreign Application Priority Data

May 22, 2012 (JP) ................................ 2012-116994
Mar. 5, 2013 (JP) ................................ 2013-043442

(51) Int. Cl.
*G06K 9/00* (2006.01)
*G06T 5/00* (2006.01)
(Continued)

(52) U.S. Cl.
CPC ............. *G06T 5/006* (2013.01); *G06K 9/4638* (2013.01); *G06T 3/00* (2013.01); *G06T 2207/10004* (2013.01); *G06T 2207/20048* (2013.01); *G06T 2207/30208* (2013.01)

(58) Field of Classification Search
None
See application file for complete search history.

(56) References Cited

U.S. PATENT DOCUMENTS

2004/0085256 A1* 5/2004 Hereld .................... H04N 9/12
345/1.1
2008/0062164 A1 3/2008 Bassi et al.
(Continued)

FOREIGN PATENT DOCUMENTS

EP        2 091 004 A2    8/2009
JP        2008-102931     5/2008
(Continued)

OTHER PUBLICATIONS

Extended European Search Report issued Apr. 16, 2015 in Patent Application No. 13793510.2.
(Continued)

*Primary Examiner* — Wesley Tucker
(74) *Attorney, Agent, or Firm* — Oblon, McClelland, Maier & Neustadt, L.L.P.

(57) ABSTRACT

A pattern processing apparatus includes an acquisition unit, an adjacent element identification unit, a connection unit, and an assigning unit. The acquisition unit acquires a pattern image in which pattern elements are arrayed in a grid, together with coordinate information of the pattern elements. The adjacent element identification unit identifies, for each of the pattern elements thus acquired, adjacent elements, in at least two directions, each having the shortest distance to the each of the pattern elements. The distances between the each of the pattern elements and other pattern elements are calculated using the coordinate information. The connection unit connects and groups, as a connected component, the pattern elements that are adjacent to one another. The assigning unit assigns position information in the array in order from the pattern element which is a starting point, among the pattern elements included in the connected component, according to a predetermined regularity.

8 Claims, 12 Drawing Sheets

PATTERN IMAGE FOR CALIBRATION

PROJECTED PATTERN IMAGE FOR CALIBRATION

(51) Int. Cl.
*G06T 3/00* (2006.01)
*G06K 9/46* (2006.01)

(56) References Cited

U.S. PATENT DOCUMENTS

| | | | | |
|---|---|---|---|---|
| 2008/0089611 A1* | 4/2008 | McFadyen | | G06T 5/006 382/289 |
| 2008/0136976 A1* | 6/2008 | Ajito | | G03B 21/56 348/745 |
| 2009/0153749 A1* | 6/2009 | Mixon | | H04N 9/3129 348/744 |
| 2009/0251620 A1* | 10/2009 | Mortensen | | H04N 9/3185 348/744 |
| 2010/0014778 A1 | 1/2010 | Imai | | |
| 2011/0211065 A1* | 9/2011 | Furui | | G03B 21/14 348/135 |
| 2011/0254810 A1* | 10/2011 | Lee | | G06F 3/0317 345/175 |
| 2012/0050488 A1* | 3/2012 | Cohen | | G06T 5/006 348/46 |
| 2012/0140189 A1* | 6/2012 | Hiranuma | | G03B 17/54 353/69 |
| 2013/0156268 A1 | 6/2013 | Sonoda | | |
| 2013/0235082 A1* | 9/2013 | Furui | | G09G 3/002 345/647 |
| 2014/0176730 A1* | 6/2014 | Kaji | | H04N 9/3185 348/189 |

FOREIGN PATENT DOCUMENTS

| | | |
|---|---|---|
| JP | 2008-113416 | 5/2008 |
| JP | 2010-028411 | 2/2010 |
| JP | 2011-054068 | 3/2011 |
| JP | 2012-079294 | 4/2012 |

OTHER PUBLICATIONS

Al Bovik, et al., "Basic binary image processing", Handbook of image and video processing, Academic Press Series in Communications, Networking, and Multimedia, XP040425211, (Jan. 2, 2000), pp. 41-42.

International Search Report issued Jul. 2, 2013 in PCT/JP2013/064549 filed on May 20, 2013.

* cited by examiner

PATTERN IMAGE FOR CALIBRATION

PROJECTED PATTERN IMAGE FOR CALIBRATION (u, v) COORDINATE SYSTEM

| FOCUSED ELEMENT | ADJACENT LEFT ELEMENT NUMBER | ADJACENT UPPER ELEMENT NUMBER |
|---|---|---|
| 1 | 0 | 0 |
| 2 | 1 | 0 |
| 3 | 2 | 0 |
| ⋮ | ⋮ | ⋮ |
| C | Cm | Cn |

ERRONEOUS RECOGNITION OF STARTING
POINT ELEMENT DUE TO NOISE

COUNTING OF NUMBER OF ELEMENTS
PER ROW/COLUMN

PATTERN PROCESSING APPARATUS, PATTERN PROCESSING METHOD, AND PATTERN PROCESSING PROGRAM

TECHNICAL FIELD

The present invention relates to a pattern processing apparatus, a pattern processing method, and a pattern processing program.

BACKGROUND ART

Normally, keystone distortion occurs in an image projected by a projector on a screen due to the relative positional relationship between the projector and the screen. Further, non-linear distortion is sometimes present due to a local unevenness or a twist in a screen where projection is performed.

To correct such distortion, Japanese Laid-open Patent Publication No. 2010-028411 discloses a technique of capturing, by a digital camera or the like, a screen on which a pattern image for calibration formed from a specific shape array is projected, calculating the degree of distortion from a shift between an ideal position and the actual extraction position of a feature point extracted from a captured image based on the shape array, and projecting, from a projector, an image which has been corrected so as to eliminate the calculated distortion:

In the case of comparing feature points of an image in an ideal state and a distorted image, a method is generally applied of calculating the amount of distortion by assigning grid array information including a column component and a row component to each feature element and comparing the feature points assigned with the same array information.

Accordingly, in Japanese Laid-open Patent Publication No. 2010-028411 described above, with respect to feature elements in a projected image, the same grid array information is assigned to a feature point existing at a closest position to a feature element in an original image before projection.

The technique as described above is effective in a case where the amount of distortion is small, but in a case the distortion is great, for example, in a case the pedestal of a projector is greatly tilted, a feature point at a different position may be positioned closest to another feature point in the original image, and in this case, wrong array information is assigned to the feature point.

DISCLOSURE OF INVENTION

The present invention has been made in view of the abovementioned issues, and it is an object of the present invention to provide a pattern processing apparatus capable of appropriately assigning position information on an array to a pattern element forming a pattern image after projection.

The present invention provides a pattern processing apparatus that includes an acquisition unit, an adjacent element identification unit, a connection unit, and an assigning unit. The acquisition unit acquires a pattern image in which a plurality of pattern elements are arrayed in a grid, together with coordinate information of the pattern elements. The adjacent element identification unit identifies, for each of the pattern elements thus acquired, adjacent elements, in at least two directions, each having the shortest distance to the each of the pattern elements. The distances between the each of the pattern elements and other pattern elements are calculated using the coordinate information. The connection unit connects and groups, as a connected component, the pattern elements that are adjacent to one another. The assigning unit assigns position information in the array in order from the pattern element which is a starting point, among the pattern elements included in the connected component, according to a predetermined regularity.

According to the present invention, position information on an array can be appropriately assigned to a pattern element forming a pattern image after projection.

BEST MODE(S) FOR CARRYING OUT THE INVENTION

Hereinafter, embodiments of a pattern processing apparatus will be described in detail with reference to appended drawings. In the embodiments, examples are illustrated where the pattern processing apparatus takes the form of a projector.

First Embodiment

Figure 1:
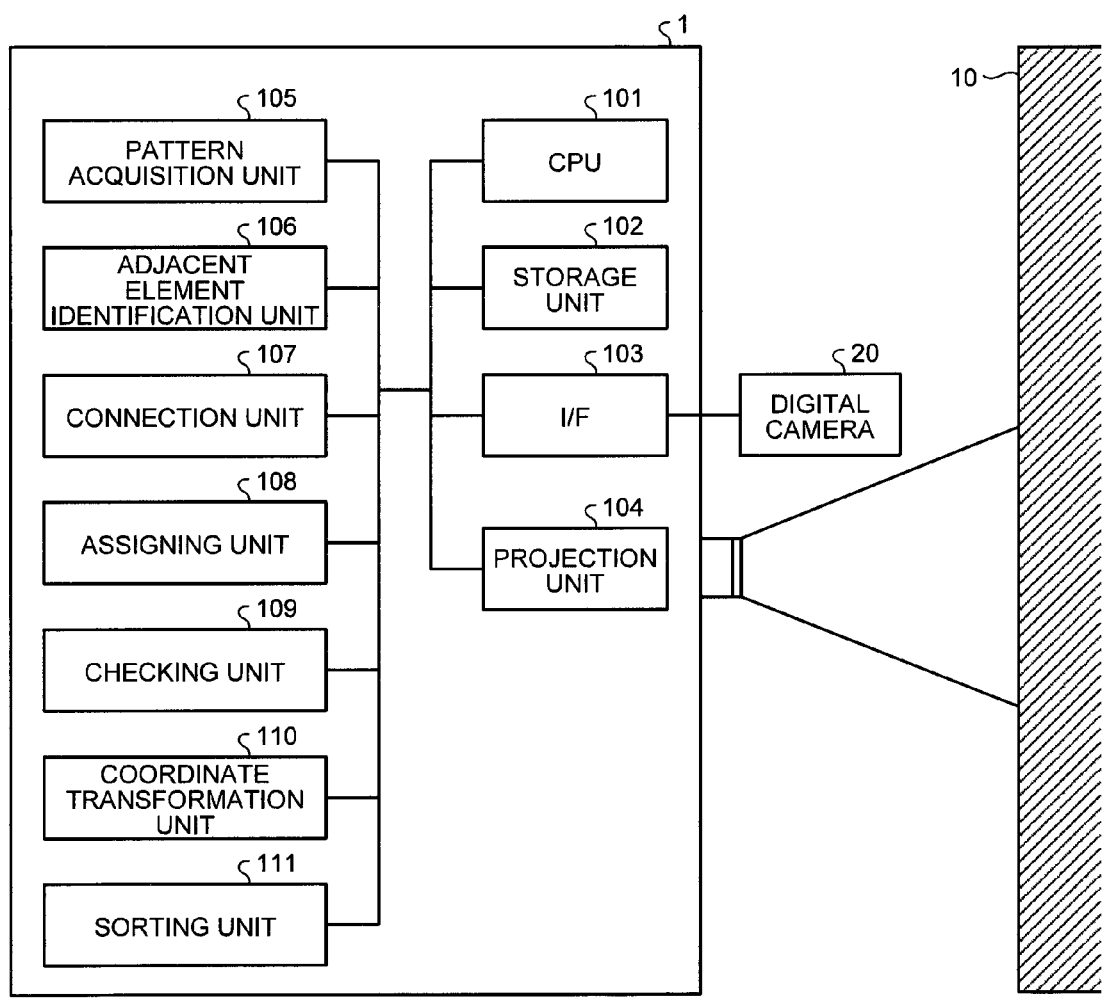
FIG. 1 is a block diagram, according to a first embodiment, illustrating a configuration of a pattern processing apparatus.

FIG. 1 is a block diagram illustrating a configuration of a projector 1 which is a pattern processing apparatus according to a first embodiment. The projector 1 projects pattern image data for distortion calibration specified in advance on a screen 10. The pattern image data for calibration which is projected is captured by a digital camera 20, and captured data is input to the projector 1 via an input cable or the like.

The projector 1 includes a CPU 101, a storage unit 102, an I/F 103, a projection unit 104, a pattern acquisition unit 105, an adjacent element identification unit 106, a connection unit 107, an assigning unit 108, a checking unit 109, a coordinate transformation unit 110, and a sorting unit 111. The storage unit 102 is configured from a hard disk, a ROM, a RAM and the like, and half-processed data of processing of various patterns in the projector 1 and pattern image data for calibration to be projected are stored therein. The I/F 103 inputs or outputs data to or from an appliance connected to the projector 1. Captured data of a pattern image for calibration which has been projected and captured by the digital camera 20 is input to the projector 1 via the I/F 103.

The projection unit 104 projects, on the screen 10, image data obtained by performing image processing based on the settings of the projector 1 on a pattern image for calibration stored in the storage unit 102.

Figure 2A:
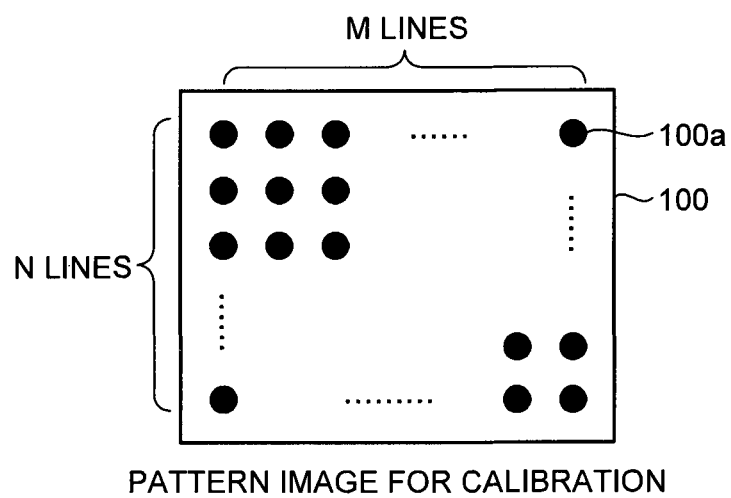
FIG. 2A is a diagram, according to the first embodiment, illustrating an example of data of a pattern image for calibration to be projected.
Figure 2B:
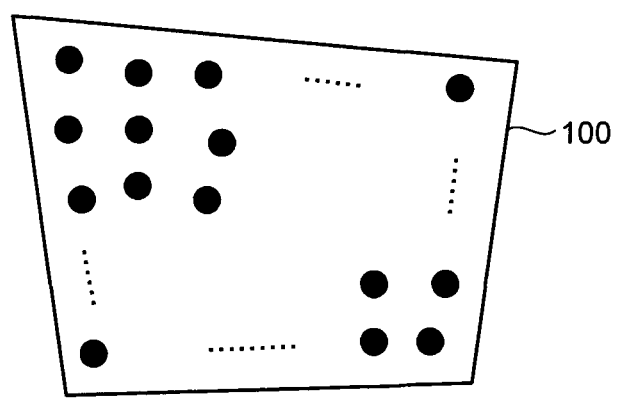
FIG. 2B is a diagram, according to the first embodiment, illustrating an example of a pattern image for calibration actually projected.

The pattern acquisition unit 105 acquires, from captured data which has been input, a pattern element forming the pattern image for calibration and coordinate information of the pattern element. FIG. 2A is a diagram illustrating a pattern image for calibration. Further, FIG. 2B is a diagram illustrating captured data which is a projected pattern image captured by the digital camera. A pattern image for calibration 100 is image data in which M×N pattern elements 100a are arranged in a grid. As illustrated in FIG. 2B, distortion may occur in the pattern image for calibration 100 at the time of projection. To correct such distortion, the pattern image for calibration 100 which is projected is captured by the digital camera 20, and the pattern acquisition unit 105 acquires the captured data. The pattern acquisition unit 105 associates the acquired pattern elements and their coordinate information, and stores the same in a buffer in the storage unit 102.

Then, how much distortion has occurred at the time of projection is perceived and the amount of correction for distortion correction is calculated by comparing the acquired pattern image and the original image data. At the time of this distortion calculation, calculation is performed by comparing pattern elements existing at the same position in a grid array. To this end, it is preferable that position information on an array is assigned also to a pattern image which is projected, and that the amount of shift is calculated with respect to a pattern element assigned with the same position information as the position information assigned in the original pattern image data. Accordingly, a process for assigning the position information to a pattern element of a pattern image which is projected is performed.

In the following, a flow of a process for allotting, to captured data of an acquired pattern image 100, position information on an array including column position information and row position information will be described using FIG. 3. In the present embodiment, position information is assigned to a pattern element by referring to an adjacency relationship identified by identifying which pattern element is adjacent to which other pattern element. In the present embodiment, an explanation is given assuming that <0, 0> which is the starting point of the position information is assigned to a pattern element positioned on the top left of a projected pattern image.

Figure 4:
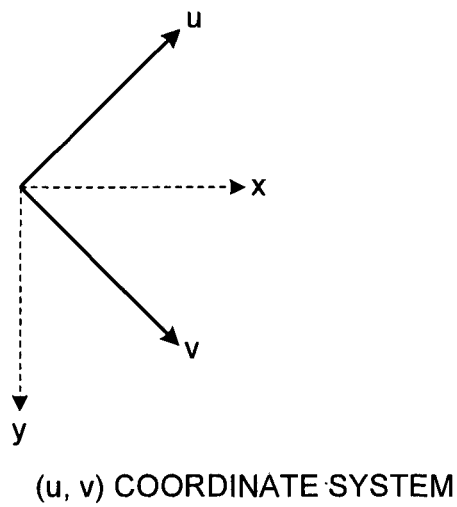
FIG. 4 is a diagram, according to the first embodiment, illustrating a uv coordinate system.

First, the coordinate transformation unit 110 transforms the coordinate information of a pattern element (step S101). Specifically, as illustrated in FIG. 4, the coordinate information of a pattern element is formed from an X coordinate and a Y coordinate. The right direction in the drawing is the positive direction of the X axis, and the downward direction is the positive direction of the Y axis. In the following, the total number of acquired pattern elements is given as C, an i-th pattern element is given as A[i], and its coordinates are given as (x[i], y[i]).

The coordinate transformation unit 110 transforms the coordinate information of a pattern element from a (x, y) coordinate system to a (u, v) coordinate system by the following equations expressed by the linear combination of the components.

$$u[i](x[i]-y[i])/\sqrt{2}$$

$$v[i](x[i]+y[i])/\sqrt{2}$$

Figure 5:
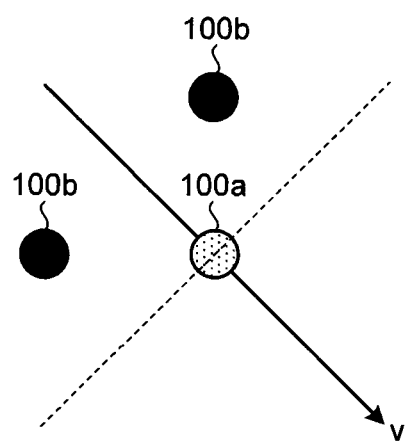
FIG. 5 is a diagram, according to the first embodiment, illustrating the uv coordinate system.

The reason of transformation to the (u, v) coordinate system as described above is that, when focusing on a v coordinate of a pattern element, with respect to the v coordinate, a pattern element 100b with a smaller v coordinate than a pattern element 100a is inevitably positioned on the upper side, or on the left of the pattern element 100a, as illustrated in FIG. 5. Note that, if a projected pattern image is projected with a tilt of 45 degrees, transformation by the coordinate transformation unit 110 using the linear combination is unnecessary. Furthermore, instead of tilting the pattern image at the time of projection, pattern elements may be arranged to be shifted 45 degrees from the start. In this case, since the transformation by the coordinate transformation unit 110 is unnecessary, processing may be accelerated.

Figure 3:
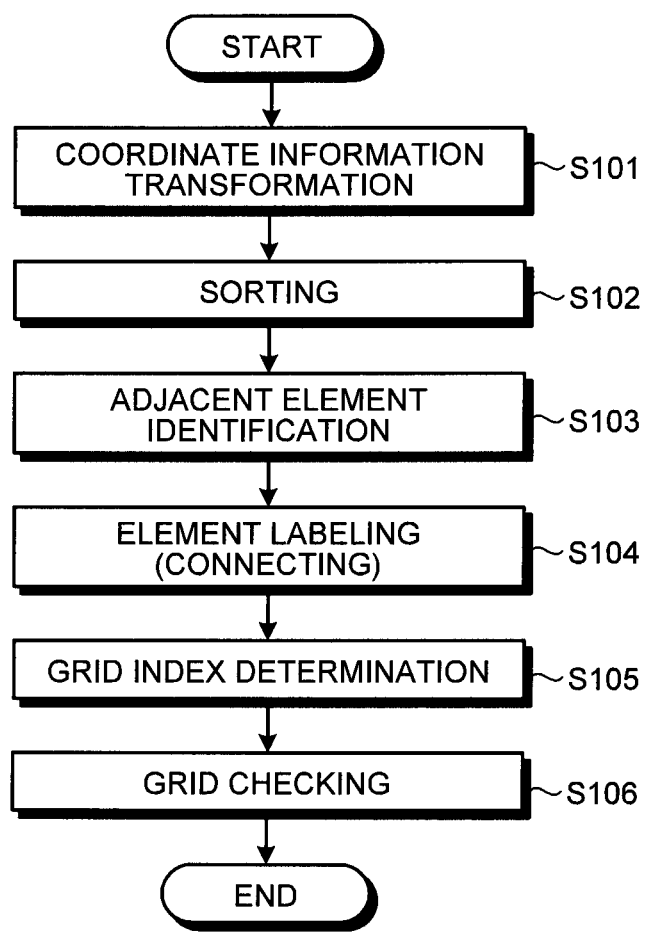
FIG. 3 is a flow chart, according to the first embodiment, illustrating a flow of pattern processing.

Next, the sorting unit 111 sorts the pattern elements with reference to the v coordinate, in order from the smallest value (FIG. 3: step S102). Due to this sorting, processing using the value of the v coordinate may be more efficiently performed in the subsequent process. Pattern elements 100a which have been sorted are sequentially assigned with i (an integer of 1≤i≤C) from the one with the smallest v coordinate value, and are stored in a different buffer from the original pattern elements in the order of sorting.

Subsequently, the adjacent element identification unit 106 identifies adjacent elements adjacent to each pattern element (FIG. 3: step S103). In the present embodiment, a pattern element is selected, and pattern elements that are adjacent to the selected pattern element in two directions, above and left, are identified. Note that, the directions of identification may be any directions as long as the positions of all the pattern elements are identified at the end, and identification may be performed for above and right, right and down, or all of the four directions, for example, as long as two directions are included. Further, with respect to the sorting described above, since the directions of identification are above and left, sorting is performed according to the size of the v coordinate so as to facilitate identification of the pattern elements positioned on the upper side and on the left, but the coordinate to be used for sorting is preferably changed according to the direction of identification.

Figure 6:
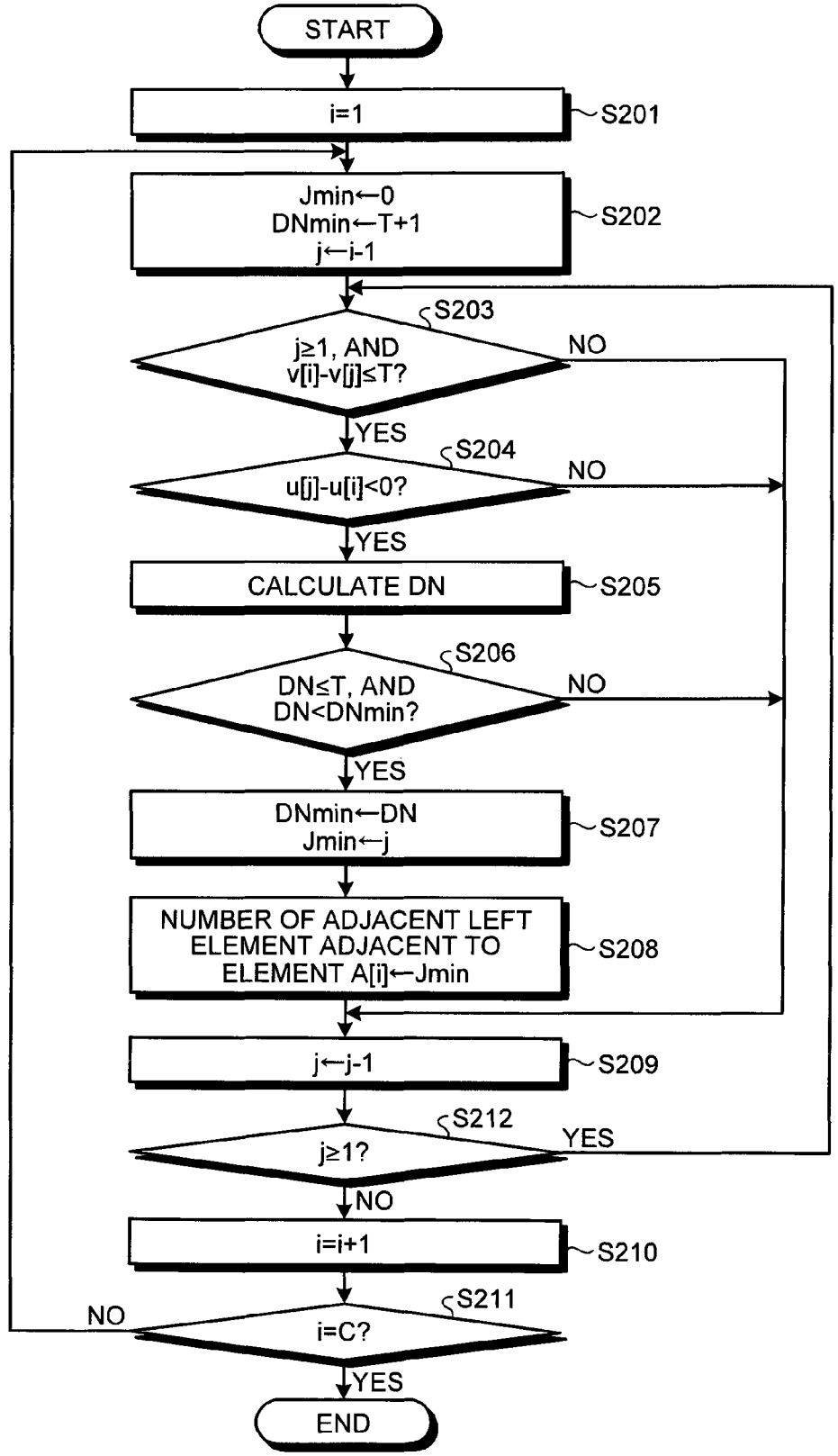
FIG. 6 is a flow chart, according to the first embodiment, illustrating a flow of a process for identifying an adjacent left element.
Figure 7:
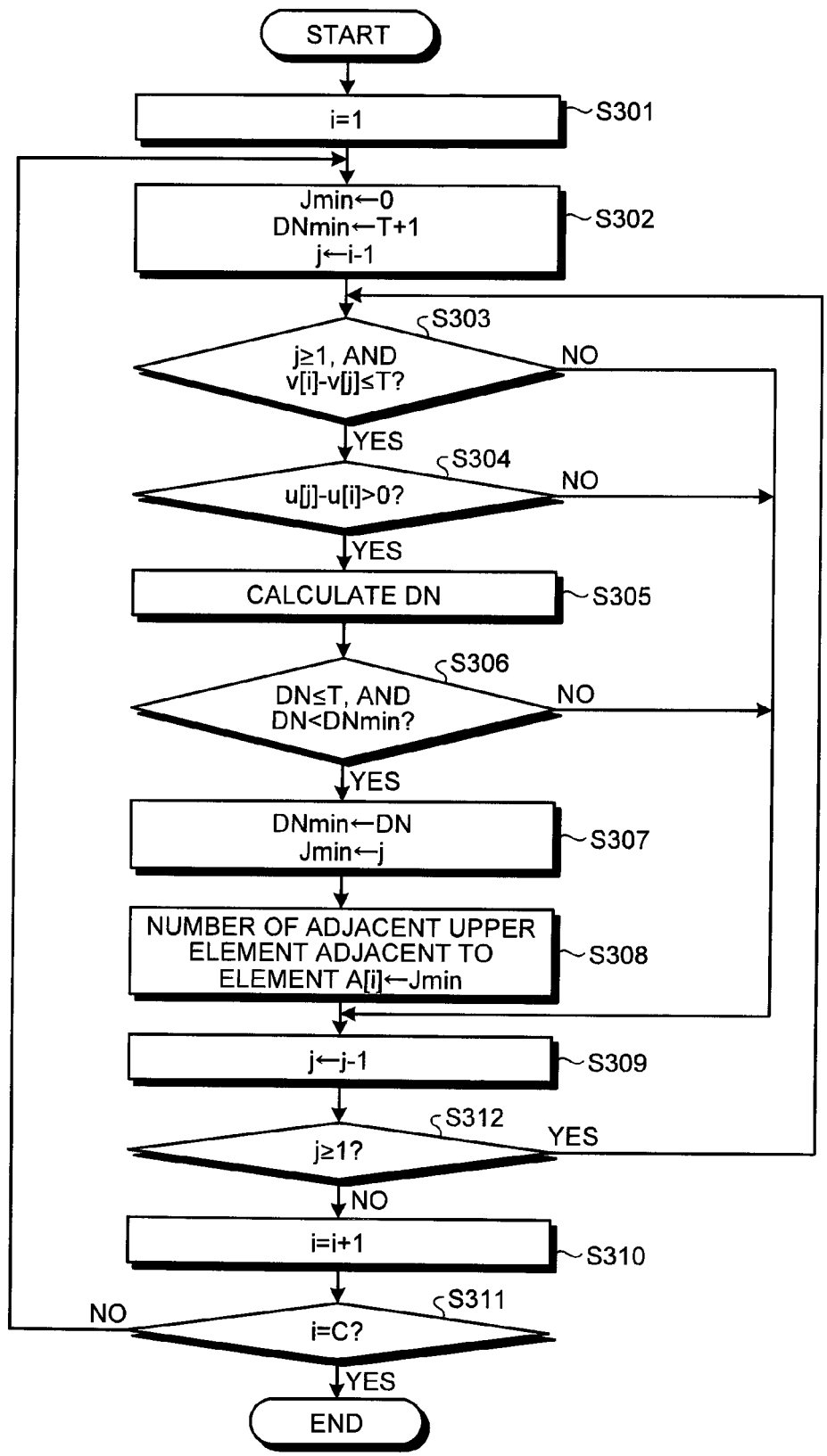
FIG. 7 is a flow chart, according to the first embodiment, illustrating a flow of a process for identifying an adjacent upper element.

In the following, the flow of a process for identifying an adjacent element will be described using FIGS. 6 and 7. FIG. 6 is a flow chart illustrating a flow of a process for identifying a pattern element that is adjacent on the left of a selected pattern element. FIG. 7 is a flow chart illustrating a flow of a process for identifying a pattern element adjacent on the upper side of a selected pattern element.

As illustrated in FIG. 6, first, the adjacent element identification unit 106 assumes that i=1 so as to start processing from a first (i-th) pattern element 100a (step S201). This "i" is a number assigned to a pattern element 100a after sorting. Then, the adjacent element identification unit 106 sets Jmin representing the number of a pattern element with the shortest distance to zero, sets DNmin, which is a threshold value indicating the shortest distance between pattern elements, to a value greater by one than T, which is a threshold value temporarily set in advance and which is a value set as a maximum value of the distance between pattern elements, and sets a number j of a j-th pattern element, which is to be compared with the i-th pattern element, to a value smaller by one than i (step S202). Since only the pattern elements 100a that are possibly present on the left side of i-th pattern element are made the processing targets, j may be a value smaller than i.

Next, the adjacent element identification unit 106 determines whether or not j is equal to or greater than 1 and v[i]−v[j] is equal to or smaller than the threshold value T (step S203). In the case j is smaller than 1, that is, in the case j is zero, i is 1, and accordingly, this is a case of the starting point, or a case where the selected pattern element A[i] has been compared with all the pattern elements A[j] that are possibly present on the left. Furthermore, by determining whether v[i]−v[j] is equal to or smaller than the threshold value T, a pattern element. A[j] whose distance to the selected pattern element A[i] is greater than the threshold value T determined above is excluded from the targets of the subsequent process. Thus, the load of the processing is suppressed.

In the case j is determined to be equal to or greater than 1, and v[i]−v[j] is determined to be equal to or smaller than the threshold value T (step S203: Yes), the adjacent element identification unit 106 then determines whether u[j]−u[i] is smaller than 0 (step S204). This u[i]−u[j] is a value for determining whether the j-th pattern element 100a is present on the upper side of the i-th pattern element 100a in the coordinate space. With the process in FIG. 6, a pattern element adjacent on the left of a selected pattern element 100a is to be identified, and thus, a pattern element 100a for which u[i]−u[j] is smaller than 0 is searched for. In the case u[i]−u[j] is determined to be smaller than 0 (step S204: Yes), DN, which is a norm of a vector between coordinates of two pattern elements A[i] and A[j], is calculated according to the following equation (step S205).

$$DN=\mathrm{SQRT}\{(u[j]-u[i])^2+(v[j]-[i])^2\}$$

Next, the adjacent element identification unit 106 determines whether DN is equal to or smaller than T, and whether DN<DNmin is true with respect to DN (step S266). By determining whether DN is equal to or smaller than T, in the case the distance between the pattern elements A[i] and A[j] is greater than T, which is a threshold value determined in advance, the pattern element A[j] is excluded from the targets of the subsequent process. Thus, the processing load is suppressed. Further, by comparing DN with DNmin, whether or not the distance between the selected pattern element A[i] and the pattern element A[j] is the shortest (closest) among the distances between the selected pattern element A[i] and the pattern elements A[j] whose DN have been compared with DNmin up to then is determined. In the case DN is equal to or smaller than T, and DN is determined to be smaller than DNmin (step S206: Yes), the adjacent element identification unit 106 updates DNmin to the value of DN, and also, substitutes j for Jmin (step S207). This Jmin is a value indicating the number of the pattern element 100a with the shortest distance to the selected pattern element. Then, the adjacent element identification unit 106 takes the number of the pattern element (referred to as an adjacent left element) adjacent on the left of the pattern element A[i] as Jmin, and proceeds to step S209 (step S208).

On the other hand, in the case j is smaller than 1, or v[i]−v[j] is greater than the threshold value T (step S203: No), in the case u[j]−u[i] is equal to or greater than 0 (step S204: No), or in the case DN is determined to be greater than T, or DN is determined to be equal to or greater than DNmin (step S206: No), j is decremented by one to perform determination of whether or not there is an adjacency relationship with respect to the next pattern element (step S209). Then, whether j is equal to or greater than 1 is determined (step S212), and in the case j is equal to or greater than 1 (step S212: Yes), the process returns to step S203, and in the case j is smaller than 1 (step S212: No), the process proceeds to step S210.

Then, when an adjacent left element, which is adjacent on left of a selected pattern element A[i], is identified in step S208, the adjacent element identification unit 106 increments i by one (step S210), and determines whether i has reached C, which is the maximum value (step S211). In the case i has reached C, which is the maximum value (step S211: Yes), the process is ended, and in the case it is determined that i has not reached C, which is the maximum value (step S211: No), the process is repeated from step S202.

In the process for identifying an adjacent upper element in FIG. 7, only step S304 is different, and whether or not u[i]−u[j] is greater than 0 is determined (step S304). In the case a pattern element A[j] is present on the upper side of a pattern element 100a, A[i], u[i]−u[j] is greater than 0. Accordingly, in the case of identifying an adjacent upper element, pattern elements 100a are narrowed down by the process of step S304. In the process described above, search is started from j=i−1 toward j=1, and when v[i]−v[j]>T becomes true, j smaller than that will inevitably mean v[i]−v[j]>T, and DN>T will be true, and thus, the search is ended, and the load of the processing is further reduced.

Figures 8, 9:
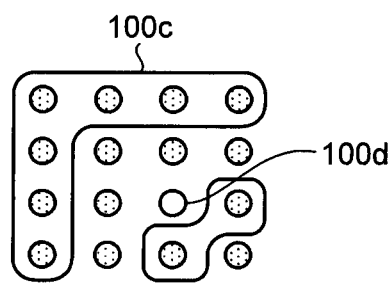
FIG. 8 is a diagram, according to the first embodiment, illustrating a relationship between identified adjacent elements.
FIG. 9 is a diagram, according to the first embodiment, illustrating an example of a pattern element with no adjacent element.

By performing this process, a problem that the same pattern element is identified for the adjacent element on the left and the adjacent element on the upper side can be prevented. The number of the adjacent upper element and the number of the adjacent left element adjacent to a pattern element 100a, A[i], identified by the method as described above are identified for each focused element, and the correspondence relationship is stored in a buffer in the storage unit 102, as illustrated in FIG. 8. Moreover, with respect to a pattern element group 100c positioned on the outer periphery of the grid array, or a pattern element group 100d whose left or upper side is missing due to a loss of a pattern element in captured data, zero meaning "none adjacent" is set as the number of the corresponding adjacent left (upper) element, as illustrated in FIG. 9.

When adjacent elements are identified, the connection unit 107 then performs an element labeling for connecting pattern elements (FIG. 3: step S104). The connection unit 107 connects and groups adjacent elements which have been identified, extracts connected components, and attaches respective labels thereto. Generally, labeling is a process for connecting adjacent black pixels, in a binary image and extracting black pixel connected component, but according to the element labeling here, target elements to be connected are not black pixels but the pattern elements, and a known labeling method which is widely used may be used for the specific process as it is.

Figure 10:
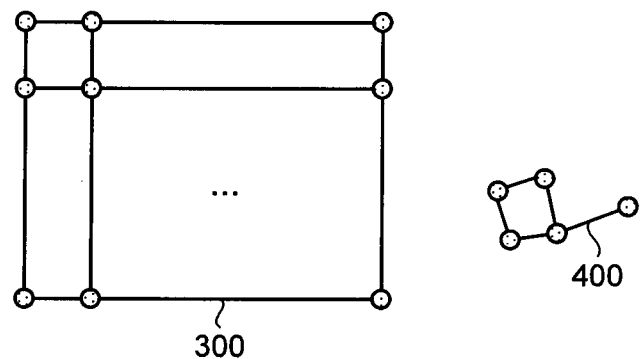
FIG. 10 is a diagram, according to the first embodiment, illustrating an example of an extracted connected component.

FIG. 10 illustrates an example of a result of generating a connected component. In FIG. 10, a first connected component 300 corresponding to a pattern image for calibration, and a separate second connected component 400 derived from a background object or a noise reflected at the time of capturing a projected pattern image are extracted. Each of the extracted connected components 300 and 400 are stored in a buffer in the storage unit 102.

Subsequently, the assigning unit 108 performs a grid index determination (FIG. 3: step S105). In the grid index determination, position information with respect to a belonging connected component is determined for each pattern element included in the extracted connected components 300 and 400. In the present embodiment, the position information is indicated by a combination <p, q> of a grid column number p (0≤p≤M−1) and a grid row number q (0≤q≤N−1).

Specifically, a pattern element at the beginning after sorting in the order of v coordinate is retrieved from each of the connected components 300 and 400, and is made the starting point of each of the connected components 300 and 400. The starting point is positioned on the upper left of each of the connected components 300 and 400, does not have an adjacent left element and an adjacent upper element, and corresponds to the starting column and the starting row of the grids. A pattern element 100a as the starting point is assigned with <0, 0> as the position information.

The assigning unit 108 refers to an adjacent element identified from a pattern element which is the starting point, and assigns, as the position information, <1, 0> to a pattern element whose adjacent left element is the starting point. Further, the assigning unit 108 assigns, as the position information, <2, 0> to a pattern element whose adjacent left element is the pattern element assigned with <1, 0>, and thereafter, sequentially assigns the position information in the same manner.

Figure 11:
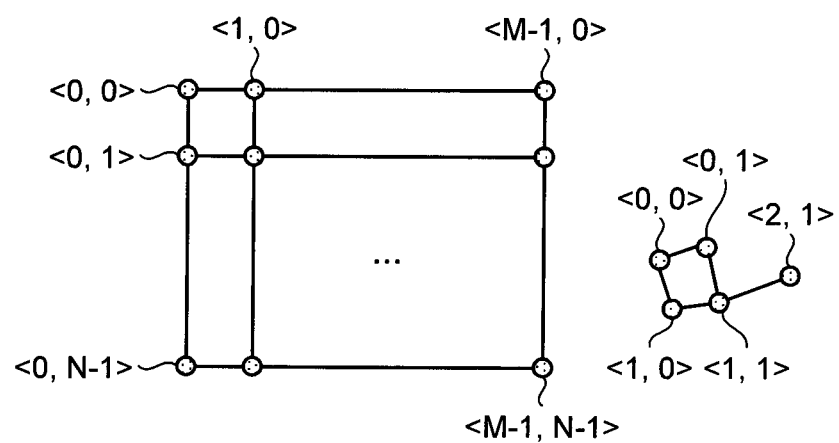
FIG. 11 is a diagram, according to the first embodiment, illustrating an example of the extracted connected component.

The assigning unit 108 assigns <0, 1> as the position information to a pattern element whose adjacent upper element is the starting point. Furthermore, the assigning unit 108 sequentially assigns the position information in the order of <1, 1> to a pattern element whose adjacent left element is the pattern element assigned with <0, 1>, <0, 2> to a pattern element whose adjacent upper element is the pattern element assigned with <0, 1>, and <1, 2> to a pattern element whose adjacent left element is the pattern element assigned with <0, 2>. With the method described above, the position information may be assigned as long as a pattern element has at least the adjacent left element or the adjacent upper element. With respect to the method of assigning the position information, besides assigning in the order of adjacent pattern elements, assigning according to a predetermined regularity is also possible. For example, the position information may be assigned in the opposite direction starting from a pattern element whose staring point is positioned on the opposite side. FIG. 11 illustrates examples of pieces of position information assigned to the connected components 300 and 400.

The connected components 300 and 400 assigned with the position information are output as a pattern image for calibration, and distortion correction is performed based on the comparison with the original pattern image, but in the present embodiment, before output, a grid checking for excluding the connected component 400 derived from a noise or the like from the pattern image for calibration to be output is performed (FIG. 3: step S106).

Figure 12:
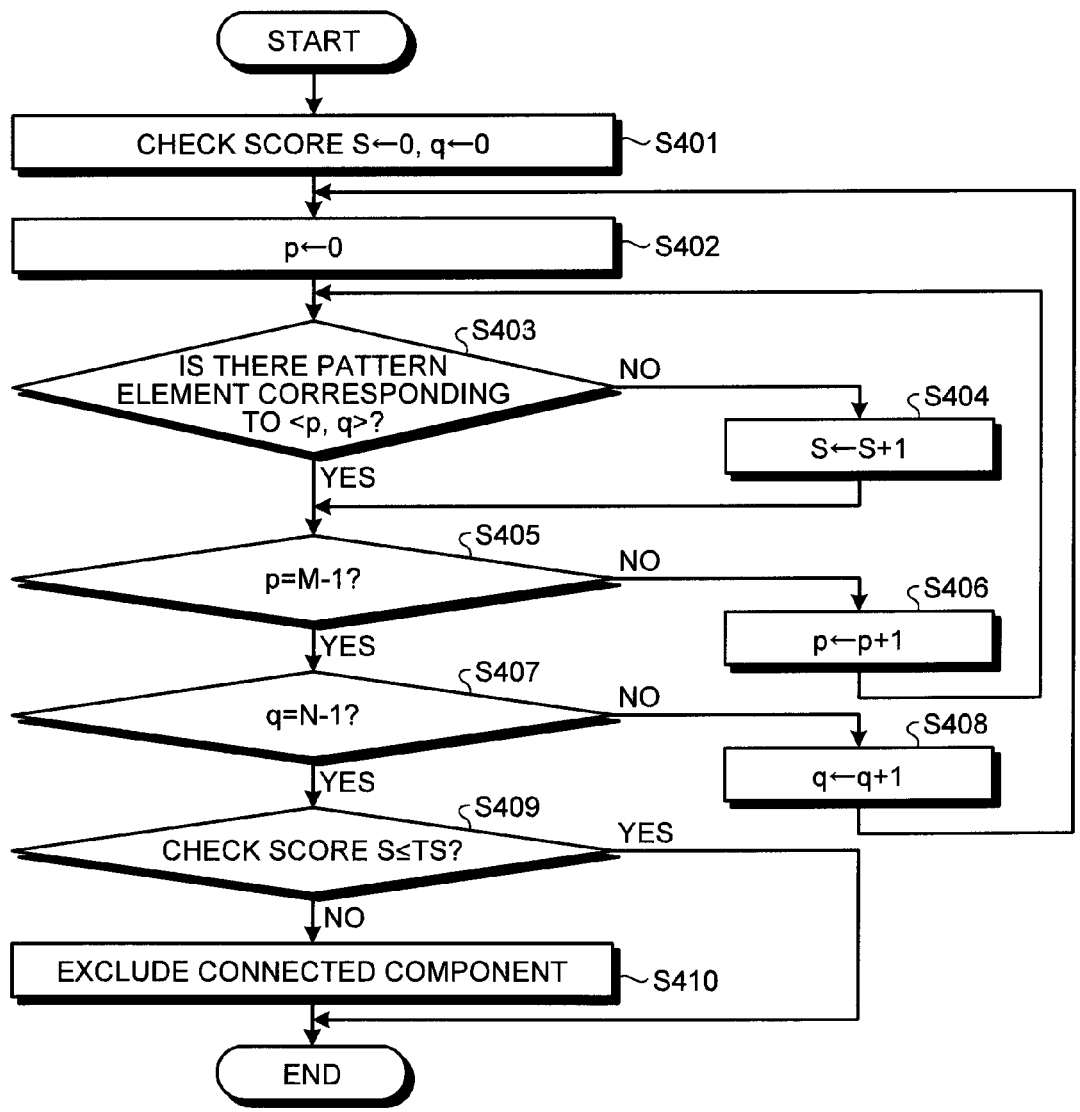
FIG. 12 is a flow chart, according to the first embodiment, illustrating a flow of a check process.

FIG. 12 is a flow chart illustrating details of the grid checking. The grid checking is performed for each of the connected components 300 and 400. As illustrated in FIG. 12, first, the checking unit 109 initializes both the values of a check score S and a row component q of the position information to zero (step S401). Next, the checking unit 109 initializes the value of a column component p of the position information to zero (step S402).

Then, the checking unit 109 determines whether or not a pattern element assigned with current position information <p, q> is present in the connected components 300 and 400 (step S403). In the case a pattern element assigned with the position information <p, q> is determined to be not present in the connected components 300 and 400 (step S403: No), the value of the check score S is incremented by one (step S404). On the other hand, in the case a pattern element assigned with the position information <p, q> is present in the connected component 300 or 400 (step S403: Yes), the check score S is not incremented, and the checking unit 109 determines whether or not p is M−1 (step S405). In the case p is determined to be not M−1 (step S405: No), that is, in the case that the last pattern element in a certain row is not yet checked, the checking unit 109 increments the value of p by one, and repeats the process from step S403 (step S406).

In the case p is determined to be M−1 (step S405: Yes), the checking unit 109 determines whether q is N−1 (step S407). In the case q is determined to be not N−1 (step S407: No), that is, in the case checking is not yet completed for all the pattern elements, the checking unit 109 increments the value of q by one, and repeats the process from step S402 with respect to the next row (step S408). On the other hand, in the case q is determined to be N−1 (step S407: Yes), the checking unit 109 determines whether the check score S is equal to or smaller than a predetermined threshold value TS (step S409). The threshold value TS is a numerical value set assuming a case where a pattern element is missing. In the case the check score S is equal to or smaller than the predetermined threshold value TS (step S409: Yes), the process is ended, and the connected component is output as a pattern for calibration. On the other hand, in the case the check score S is greater than the predetermined threshold value TS (step S409: No), the checking unit 109 excludes the connected component from the pattern image for calibration to be output (step S410).

In the case of the connected component 300 described above, since M×N pattern elements, which are the original pattern image, are included, the check score S does not exceed the threshold value TS, and the connected component is not excluded from the pattern image for calibration to be output. On the other hand, the pattern elements of the connected component 300 are only <0, 0>, <0, 1>, <1, 0>, <1, 1>, and <2, 1>, and pattern elements fall short by M×N−5 of the number of pattern elements that are supposed to exist, and thus, the check score S is M×N−5 and the threshold value TS is exceeded in a normal case, and the connected component 300 is excluded from the pattern image for calibration to be output.

A connected component checked in this manner is output as the pattern image for calibration, the amount of distortion is calculated based on comparison with a pattern image stored in the storage unit 102 with respect to pattern elements assigned with the same position information, and the amount of correction for distortion correction is automatically calculated.

According to the pattern processing apparatus of the present embodiment described above, position information in a grid arrangement can be appropriately assigned to each pattern element forming a pattern image even if various types of distortion, such as skew, keystone distortion, local non-linear distortion and the like, are present in the pattern image that is projected.

Second Embodiment

A second embodiment is different from the first embodiment in the process for identifying an adjacent element to be performed on each pattern element, to be performed in a case there is a pattern element A[j] that satisfies a condition of DN≤T and DN<DNmin in step S206 in FIG. 6 and step S306 in FIG. 7.

Figure 13:
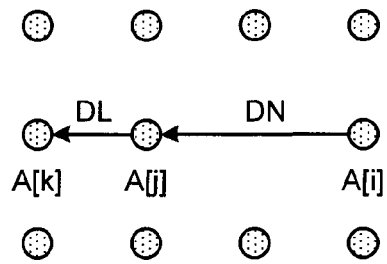
FIG. 13 is a diagram, according to a second embodiment, illustrating a distance between elements.

Normally, this pattern element A[j] is the adjacent left element or the adjacent upper element that is adjacent to the pattern element A[i], but in the case captured data is partially missing, the missing part may be skipped and a pattern element A[j] which is supposed to be the next pattern element but one may be possibly acquired as the adjacent element. Such a state is illustrated in FIG. 13. For example, such a state tends to occur in a case the threshold value T, which is the maximum value of distance between elements, is set to a great value in order to allow flexibility with respect to the image capturing distance between a camera and a screen at the time of capturing. Moreover, the state as illustrated in FIG. 13 tends to occur also in a case where the image capturing distance is great and the entire pattern image is rather small.

Accordingly, in the present embodiment, a distance DN between pattern elements A[i] and A[j] is compared with a distance DL between pattern elements A[j] and its adjacent left element A[k]. Normally, there is no great difference between DN and DL, but here, DN is greater than DL by more than 1.5 times, that is, DN>DL×1.5 is true. In the present embodiment, A[j] is discarded and the adjacent left element of the focused element A[i] is set to "none".

Note that, in the case the adjacent left candidate A[j] does not have an adjacent left element adjacent thereto, the process described above is not performed. With the projector 1 of the present embodiment, an error of identifying a pattern element which is the next pattern element but one as the adjacent element by mistake in the case there is a missing pattern element may be avoided. Moreover, a multiplier 1.5 may be replaced by another value, 1.5 being only an example, or determination using a formula of adding a constant to DL is also possible instead of multiplying DL by a constant.

Third Embodiment

Figure 14A:
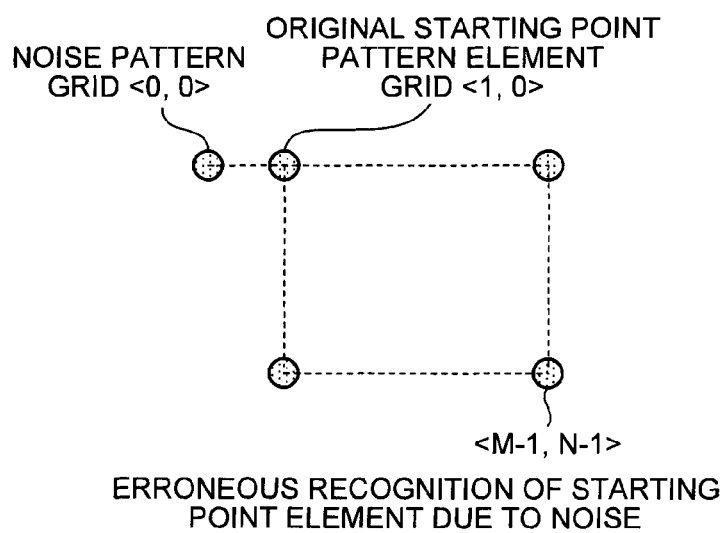
FIGS. 14A and 14B are diagrams illustrating a case where an element which is a starting point is a noise.

In the embodiment described above, normally, in determining the position information in an array, the pattern element at the beginning among the sorted pattern elements in a connected component is made the starting point. However, as illustrated in FIG. 14A, there is a possibility that a pattern element corresponding to a noise is erroneously taken as the starting point, and that the starting column is erroneously recognized. Further, depending on the position of a noise, the starting row may be incorrect in the same manner. Accordingly, in the present embodiment, a configuration for detecting incorrect assignment of position information due to such a noise, and for correcting the same is adopted.

Figure 14B:
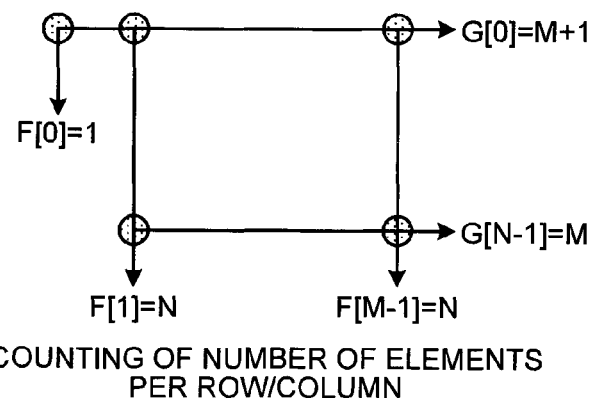

Specifically, as illustrated in FIG. 14B, after position information in an array <i, j> is assigned once, a count value F[i] having a column component=i (position information component) is counted for each column component i. In the same manner, a count value G[j] having a row component=j is counted for each row component j.

In the case of FIG. 14B, in the position information in the array, there is only one pattern element having a column component=0, which corresponds to a noise, and this is given as F[0]=1; and a pattern element group originally corresponding to the starting column correspond to pattern elements having column components=1, and this is given as F[1]=N assuming there is no missing element in M columns, N rows. Further, the original starting row and pattern elements correspond to pattern elements having row components=0, and are given as G[0]=M+1.

Then, the smallest i in the column whose count value F[i] matches the original number of rows N is newly determined as the starting column of the grid, and the smallest j in the row whose count value G[j] matches the original number of columns M is newly determined as the starting row of the grid.

The process described above may be expressed by the following equations.

New starting column: $i0=\mathrm{MIN}\{i|N=F[i]\}$

New starting row: $j0=\mathrm{MIN}\{j|M=G[j]\}$

Then, i0 is subtracted from the column component of the position information of each array so that the column number of the new starting column will be zero, and j0 is subtracted from the row component so that the row number of the new starting row will be zero. According to the present embodiment, even if a starting point is incorrectly assigned due to the presence of a noise in the captured data, the grid starting column/starting row may be correctly assigned.

Note that, in this case, for example, determination of whether or not the number of counted pieces is within a predetermined range set in advance may be performed instead of determination of whether or not the number of counted pieces matches the original number of rows N, and if within the range, the matrix may be assumed to be correct. Further, application is possible not only in the case of a two-dimensional array but also in the case of a three-dimensional array, by counting the number of pattern elements for each array.

Fourth Embodiment

Figure 15:
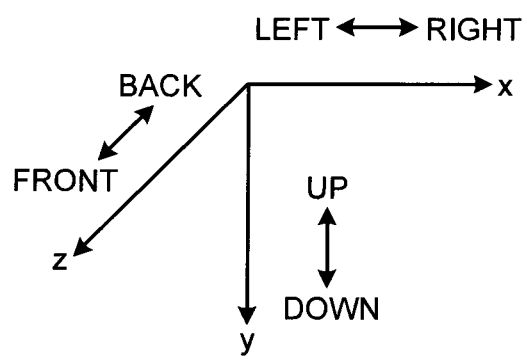
FIG. 15 is a diagram, according to a fourth embodiment, illustrating a three-dimensional coordinate space.

In the embodiments described above, the case of using an image where the pattern for calibration is formed two-dimensionally, horizontally and vertically, is indicated, but the present invention may be applied also in the case of using a three-dimensional pattern. The case of three-dimensions will be described using FIGS. 15 and 16. As illustrated in FIG. 15, three-dimensional coordinates are formed from an X coordinate axis indicated by left and right, a Y coordinate axis indicated by up and down, and a Z coordinate axis indicated by back and front.

In a three-dimensional coordinate space, transformation from (x, y, z) to (u, v, w) is performed according to the following equations.

Figure 16:
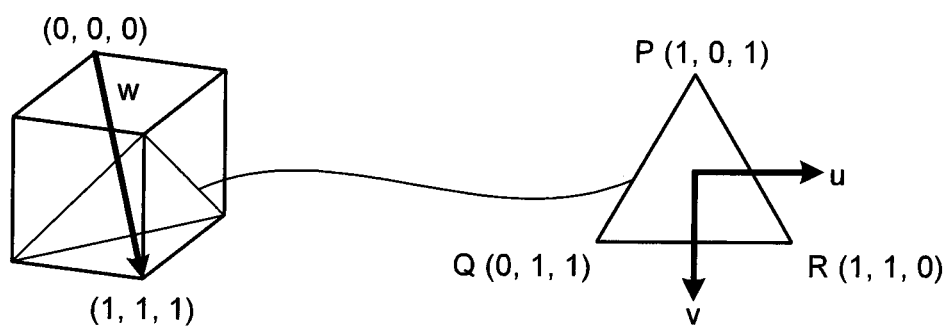
FIG. 16 is a diagram, according to the fourth embodiment, illustrating the three-dimensional coordinate space.

$u[i]=(x[i]-z[i])/\mathrm{SQRT}\{2\}$ $v[i]=(-x[i]+2*y[i]-z[i])/\mathrm{SQRT}\{6\}$ $w[i]=(x[i]+y[1]+z[i])/\mathrm{SQRT}\{3\}$ In a fourth embodiment, position information in an array is assigned with the pattern element positioned on the top left back side as the starting point. Accordingly, the sorting unit 111 performs sorting in the order from one with a small w coordinate value. FIG. 16 illustrates a state of a (u, v, w) coordinate space after the sorting.

In the three-dimensional coordinate space, with respect to a certain pattern element, identification of three pattern elements, an adjacent left element, an adjacent upper element and an adjacent back element, is performed. Distinction between an adjacent left element, an adjacent upper element and an adjacent back element can be known based on an angle θ between a vector obtained by projecting a vector pointing from a selected pattern element toward a search target pattern element on an uv plane, and an u-axis unit vector. For example, it is determined to be an adjacent left element if the angle θ is 90°<θ≤210°; it is determined to be an adjacent upper element if the angle θ is 210°<θ≤330°; and it is determined to be an adjacent back element if the angle θ is 0≤θ≤90° or 330°<θ<360°. This determination process corresponds to the processes of steps S204 and S304 in FIGS. 6 and 7 for determining the direction of an adjacent element. Further, regarding the adjacent element, one which is the closest to the distance indicated by the w axis in each direction is identified as the adjacent element.

When the adjacent element is identified, position information can thereafter be assigned to each pattern element, and position information <0, 0, 0> is assigned to an element with the smallest w coordinate among the extracted pattern elements as the starting point. Subsequently, column position information, row position information and layer position information of each pattern element may be sequentially assigned while referring to the adjacency relationship identified for each pattern element.

In each of the embodiments described above, pattern elements expressed in black and white are used in a pattern image. The pattern elements may, in contrast, be colored according to the regularity of the array. For example, pattern elements may be arranged such that a green pattern element and a blue pattern element are positioned on the right and below of a red pattern element. Alternatively, the pattern elements may be arranged such that a blue pattern element and a red pattern element are arranged on the right and below a green pattern element. Still alternatively, the pattern elements may be arranged such that a red pattern element and a green pattern element are positioned on the right and below a blue pattern element. By arranging the pattern elements in this manner, even if the adjacency relationship between pattern elements are hard to know from the positional relationship, the accuracy of identification of adjacency relationship between pattern elements may be improved by referring to color information.

Figure 17:
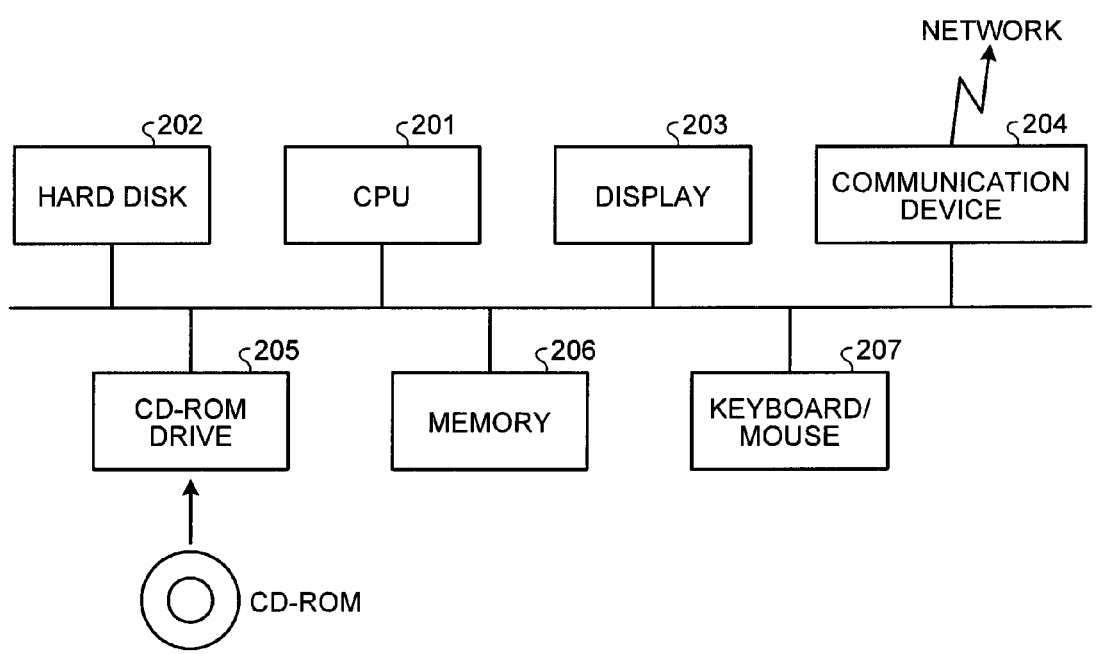
FIG. 17 is a diagram illustrating an example of a hardware configuration of a pattern processing apparatus.

The pattern processing may be executed by a computer program on a computer. FIG. 17 is a hardware configuration diagram illustrating a configuration of a regular computer, and a CPU 201, a hard disk 202, a display 203, a communication device 204, a CD-ROM drive 205, a memory 206, and keyboard/mouse 207 are included. For example, a pattern processing program recorded in a recording medium such as a CD-ROM may be read by the CD-ROM drive 205, and be loaded on the memory 206 at the time of execution, and processing steps of the program may be sequentially executed according to a command from the CPU 201. An input image is stored in the hard disk 202 in advance, or is imported, at the time of execution, via a digital camera not illustrated, and is then loaded on the memory 206 to be referred to. A result of pattern extraction is saved in the memory 206 and is then read from the memory 206 as necessary, and is written on the hard disk 202, output to the display 203, transmitted to a network via the communication device 204, or printed on paper by a printer not illustrated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A pattern processing apparatus comprising:
   an acquisition unit configured to acquire a pattern image in which a plurality of pattern elements are arrayed in a grid, together with coordinate information of the pattern elements;
   an adjacent element identification unit configured to identify, for each pattern element of the acquired pattern elements, adjacent elements, in at least two directions, each adjacent element having a shortest distance to the pattern element in one of the at least two directions, wherein distances between each of the pattern elements and other pattern elements are calculated using the coordinate information;
   a connection unit configured to connect and group, as a connected component, the pattern elements that are identified as adjacent to one another; and
   an assigning unit configured to assign position information in the connected component in order from a starting pattern element which is a starting point, among the pattern elements included in the connected component, according to a predetermined regularity.

2. The pattern processing apparatus according to claim 1, further comprising:
   a checking unit configured to determine whether a number of the pattern elements included in the connected component satisfies a predetermined condition, and exclude, when the predetermined condition is not satisfied, the connected component from the pattern image for calibration.

3. The pattern processing apparatus according to claim 1, further comprising:
   a coordinate transformation unit configured to transform coordinate information of the pattern elements to a coordinate system that is a linear combination of an original coordinate system; and
   a sorting unit configured to perform sorting of the pattern elements based on any of values of coordinate information after the linear combination,
   wherein the assigning unit sets, as the starting point, the pattern element whose coordinates used in sorting are positioned first in order of sorting.

4. The pattern processing apparatus according to claim 1, wherein the adjacent element identification unit selects one focused element from the pattern elements, calculates distances between the focused element and other pattern elements in the at least two directions, and identifies, as the adjacent elements, the pattern elements having the distances equal to or smaller than a first threshold value and that are closest in the at least two directions to the focused element.

5. The pattern processing apparatus according to claim 1, wherein when a distance between any pair of pattern elements adjacent to each other that have been assigned with the position information is a predetermined amount greater compared to a distance between other pair of pattern elements adjacent to each other in an adjacent direction, the adjacent element identification unit excludes the pattern element from the adjacent elements.

6. The pattern processing apparatus according to claim 1, wherein the position information is position information in an N-dimensional array (N is a positive integer), and the assigning unit counts a number of pattern elements with a same value for a position information component in an array dimension assigned to the pattern elements, re-sets a pattern element with smallest position information as the starting point in an array dimension where the number of the pattern elements is in a range set in advance as a number of the pattern elements to be included in each array dimension, and assigns new position information to each of the pattern elements using the starting point that is set as a reference.

7. A pattern processing method, comprising:

acquiring a pattern image in which a plurality of pattern elements are arrayed in a grid, together with coordinate information of the pattern elements;

identifying, by processing circuitry, for each of the acquired pattern elements, adjacent elements, in at least two directions, each adjacent element having a shortest distance to the pattern element in one of the at least two directions, wherein distances between each of the pattern elements and other pattern elements are calculated using the coordinate information;

connecting and grouping, as a connected component, the pattern elements that are identified as adjacent to one another; and assigning position information in the connected component in order from a starting pattern element, which is a starting point, among the pattern elements included in the connected component, according to a predetermined regularity.

8. A computer program product comprising a non-transitory computer-readable medium comprising a pattern processing program that causes a computer to execute:

acquiring a pattern image in which a plurality of pattern elements are arrayed in a grid, together with coordinate information of the pattern elements;

identifying, for each of the acquired pattern elements, adjacent elements, in at least two directions, each adjacent element having a shortest distance to the pattern element in one of the at least two directions, wherein distances between each of the pattern elements and other pattern elements are calculated using the coordinate information;

connecting and grouping, as a connected component, the pattern elements that are identified as adjacent to one another; and assigning position information in the connected component in order from a starting pattern element, which is a starting point, among the pattern elements included in the connected component, according to a predetermined regularity.

* * * * *